Figure 1:
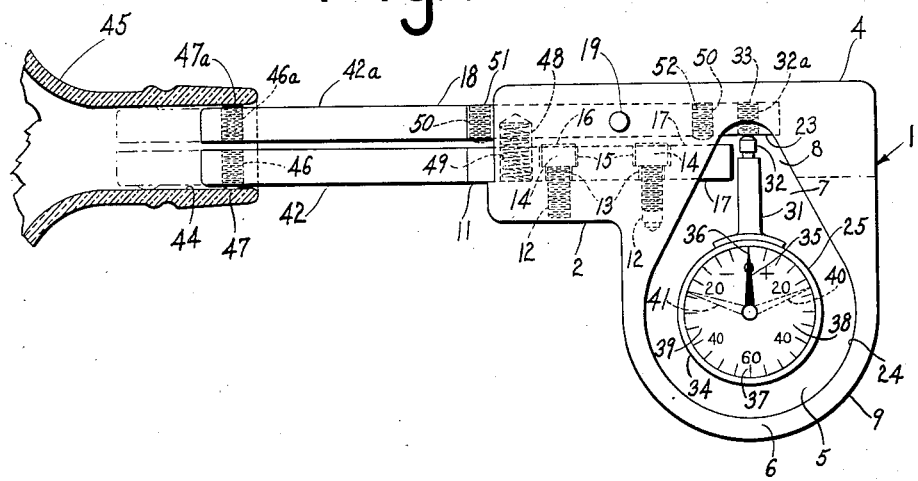

April 26, 1949. H. W. INGLE 2,468,496
GAUGE FOR INTERNAL SURFACES OF
BOTTLES AND THE LIKE
Filed Aug. 12, 1946

INVENTOR
HENRY W. INGLE
BY Parham + Bates
ATTORNEYS

Patented Apr. 26, 1949

2,468,496

UNITED STATES PATENT OFFICE 2,468,496

GAUGE FOR INTERNAL SURFACES OF BOTTLES AND THE LIKE

Henry W. Ingle, Windsor, Conn., assignor to Hartford-Empire Company, Hartford, Conn., a corporation of Delaware Application August 12, 1946, Serial No. 689,843

2 Claims. (Cl. 33—148)

This invention relates to improvements in devices for gauging the internal surfaces of open end portions of hollow glass articles, especially the internal or corkage surfaces of bottles and other glass containers.

It is important to ascertain if such hollow glass articles have their internal surfaces referred to formed to meet specifications as to their size and shape. In the case of bottles and other containers which are to be sealed by corks, stoppers, or other internal closures, corkage or other internal sealing surfaces, which are defective because of undue deviation from prescribed dimensions or configurations, may render the containers unsuitable for their intended use because they cannot be satisfactorily closed and sealed by the corks or other closures ordinarily provided for that purpose, or their defective condition may interfere seriously with closing and sealing thereof by customarily used container corking or closing and sealing machinery. Such defective containers preferably should be found and discarded as soon as they have been produced. Otherwise, they may become mixed with good containers and thus constitute a source of possible future trouble or difficulty to the bottler, packer, or consumer. Moreover, defective corkage or internal sealing surfaces of bottles or other containers may be caused by some defect in or shortcoming of the container-producing machinery or operation which may be difficult or impossible to detect until the consequence thereof has been noted in the articles produced. Obviously, early detection of the defect in the articles produced will enable the glass container manufacturer to cure the trouble at its source so as to keep to a minimum loss caused by the production of defective ware.

A common defect occurring in glass bottles is that known by the art as "choke." "Choke" in a bottle neck consists of an inward bulge or protrusion formed on the internal surface of the neck portion during the forming of the bottle. A small degree of choke can be tolerated without ill effect. However, when the "choke" becomes sizable, serious difficulties result in the filling process. Normally a tube is inserted into the neck portion of the bottle through which the contents of the bottle are introduced thereinto. Jamming or wedging of the tube into the "choke" causes costly and time-consuming delays and usually breaks the filling tube.

Use of the gauge herein disclosed enables the operator of a glass forming machine producing bottles to ascertain simply and rapidly any tendency towards "choke" in the bottles being produced and warns the operator to make the necessary changes to eliminate or minimize the "choke." The gauge is also of interest to the bottler as an inspection device to insure that dimensionally accurate ware will be fed into his filling machines.

An object of the present invention is to provide a simple, relatively inexpensive and conveniently usable manual gauge by which the operator of a glass container forming machine or other workman may quickly and accurately gauge the internal corkage or sealing surface of a bottle or other container to ascertain whether or not such surface is defective.

A further object of this invention is to provide a gauge for measuring the deviations of the internal surface of such an article from a true circular cross-sectional shape and a given diameter or diameters at various axial positions along the neck finish or sealing portion of the article.

Figure 2:
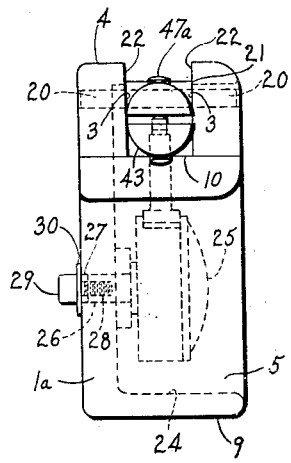

Other objects and advantages of this invention will be described and be made apparent in the course of the following description, having particular reference to the accompanying drawings, in which:

Fig. 1 is a side elevation view of a representative gauge showing in longitudinal cross-section a section of a bottle in position to be gauged, the view showing by dotted and full lines different positions of several movable parts thereof; and Fig. 2 is an end view of the gauge in the position which it assumes when not in a gauging condition.

The gauge shown comprises a body, designated generally 1, formed to provide a handle or grip portion 1a of suitable shape and size to be manually grasped and held by a user, and a forwardly projecting portion or barrel 2. The gauge body is formed to define a longitudinal slot 3 of rectangular cross-section in the barrel and body portion thereof. This slot is flanked by two body surfaces 4. The body is formed to define a cavity 5 in a face 6 of its handle or grip portion. Cavity 5 has an elongate portion 7 communicating with longitudinal slot 3 in the region designated 8. An outside body wall 9, surrounding cavity 5, preferably is rounded for convenient gripping by the operator's hand.

Secured to bottom surface 10 of the longitudinal slot 3 and projecting beyond the barrel 2 is a fixed gauging support member 11 in the form of a bar. This bar is of rectangular cross-section in the portion thereof in the slot 3. Two threaded holes 12 are provided in the body 1 at the bottom of the slot 3. Two holes 13 are provided in the fixed-gauging support 11, so spaced as to line up axially with the threaded holes 12. Two cap bolts 14 pass through the support 11 and are threaded into holes 12 to secure support 11 to the body 1. Counterbores 15 are provided in support 11 concentric with holes 13. The counterbores are of sufficient depth to obviate or minimize projection of the heads 16 of cap bolts 14 above surface 17 of support 11.

A movable gauging support member 18 in the form of a bar is intermediately pivoted on pivot pin 19. Ends 20 of pivot pin 19 are secured in body 1. Support 18, in the slot 3, is of rectangular cross-section and of a sufficient width to minimize to a practical working amount the side clearance between side surfaces 21 of support 18 and side surface 22 of slot 3. An end extension 23 of movable gauging support 18 extends into the portion 7 of cavity 5.

Cavity 5 is defined by internal wall surface 24 which is of sufficient depth to protectively retain dial indicator 25. Integral with indicator 25 is a socket 26 perpendicularly extending from the base surface thereof. A hole or aperture 27 is provided through the bottom wall of the cavity 5. Socket 26 is of insufficient length to project through hole 27 to the rear face of the gauge body. Socket 26 has internal threads 28 to receive the threaded end of cap bolt 29. The head of cap bolt 29 bears on washer 30 which, in turn, bears on the rear face of the gauge body and, thereby, releasably secures indicator 25 to said gauge body.

Indicator 25 has a longitudinal stem housing 31 for a movable indicator stem 32. A threaded hole 32a is provided in movable support 18, the axis of said hole being coincidental with the axis of movable indicator stem 32. A threaded set screw 33 or similar adjustable calibration member is disposed in threaded hole 32a to set indicator 25 to a predetermined reading, as will be described hereinafter. The particular indicator shown in the drawing is a commercial unit which is supplied by the Federal Products Company, Providence, Rhode Island, as their "Federal Dial Indicator, Model A-6Q." It has a circular dial, indicated as 34 in Fig. 1. This dial has a circular series of graduations thereon for showing dimensional variations in thousandths of an inch from a dimension which is indicated when the pivoted indicator hand or pointer 35 registers with graduation 36 as shown in full lines in Fig. 1. The pointer is moved angularly about the dial in response to longitudinal movements of stem 32 in the manner usual in dial indicators. Dial 34 is graduated in such a manner that hand 35 indicates thereon a number of thousandths of an inch of movement equal to three times the actual movement of the stem, i. e., when the hand indicates thirty thousandths of an inch movement from an index point, the stem has actually moved only ten thousandths of an inch from its corresponding index point. Graduations, which extend in a semicircle clockwise between graduation 36 and a diametrically opposite graduation 37, Fig. 1, constitute a "plus" scale, designated as 38. The corresponding graduations on the other half of the dial constitute a "minus" scale, designated 39. These scales are appropriately marked for easy, accurate reading of variations from zero to sixty thousandths of an inch, "plus" and "minus," according to whether the pointer 35 is swung clockwise from its full position as through the position 40 indicated by the dotted lines or counterclockwise as through the position 41 indicated by dot-and-dash lines, respectively. Inward movement of stem 32 in its housing will cause a clockwise swinging movement of the pointer and, of course, it will swing in the opposite direction or counterclockwise, when the movement of the stem in its housing is opposite.

The dial indicator, per se, does not form part of the present invention but is a commercial unit of a type well-known to those skilled in the art to which the present invention relates. It, therefore, is unnecessary to further illustrate or describe the particular indicator above referred to. Any other suitable known indicator or comparator may be used in lieu thereof.

Fixed support 11 and movable support 18 have end portions 42 and 42a, respectively, extending from gauge body 1. The extensions 42 and 42a of supports 11 and 18 may be semi-cylindrical in cross-section so that, when in working relationship, they have a full cylindrical shape 43 simulating the internal contour 44 of a bottle or like article 45. Two co-axial threaded holes 46 and 46a are provided in end extensions 42 and 42a, respectively, these holes having their longitudinal axes parallel to the longitudinal axis of indicator stem 32. Set screws 47 and 47a or other suitable adjustable contact elements are disposed in threaded holes 46 and 46a, respectively, in such a manner that the ends of the set screws project outwardly from supports 11 and 18 to bear in working disposition on internal surface 44 of the neck finish portion of bottle 45. The ends of said set screws may have hemispherical shapes to provide point contacts with surface 44 without danger of scratching this surface or may be given any suitable shape to give any desired bearing relationship to the surface to be gauged.

The distance from the center line of set screws 47 and 47a to the center line of pivot pin 19 is three times the distance from the center line of pin 19 to the center line of set screw 33. With the above proportions and an indicator dial graduated as hereinbefore described, a change in the distance between the contact points of set screws 47 and 47a causes a true corresponding change in reading of the indicator, i. e., a movement of twenty thousandths of an inch in the relative positions of set screws 47 and 47a causes a change of reading of the indicator of twenty thousandths of an inch.

Proportions of the gauging elements different from those hereinbefore described can be used if the graduations of the dial are correspondingly altered.

A circular hole 48 is provided through fixed support 11 and partially through movable support 18; the axis of hole 48 is parallel to the longitudinal axis of indicator stem 32. Disposed in hole 48 is a compression spring 49 bearing on the barrel 2 and the movable support 18, the action of said spring being to induce the movement of supports 11 and 18 in opposed directions, thus bringing set screws 47 and 47a into measuring contact with surface 44 of article 45. Two threaded holes 50 are provided in movable support 18. Said holes are disposed on opposite sides of pivot pin 19 and have their axes parallel to the longitudinal axis of indicator stem 32. Two set screws 51 and 52 or other suitable adjustable members are provided in threaded holes 50 and may be adjusted to project more or less from these holes toward the fixed gauging support 11 for contact with the latter to limit the swinging movements of support 18 about its pivotal axis, The gauge body 1 may be made of aluminum or any other suitable metal or material in any suitable known manner. Supports 11 and 18 may be made of steel or other suitable wear-resistant material. Set screws 47 and 47a preferably should be made of hardened steel or other similar material to resist the abrasive action encountered during the gauging operation.

The gauge is adjusted for operative use as follows: A hollow, cylindrical master gauging ring (not shown) of the mean preferred diameter is placed over set screws 47 and 47a and is so located as to have its axis perpendicular to the longitudinal axis of the movable indicator stem 32. The axis of the gauge ring should be held vertically so that the weight of the ring does not rest on the movable gauging contact support 18 and thereby compress spring 49 and adversely affect the reading of indicator 25. Set screws 47 and 47a are adjusted until supports 11 and 18 are approximately parallel and so that these set screws project approximately the same distance outwardly from their respective supports. To make the adjustment of set screws 47 and 47a, the gauge must be removed from the master gauge ring. When set screws 47 and 47a have been adjusted and the master gauge ring is properly located over these set screws according to the foregoing, screw 33 is adjusted in its working relationship to the movable indicator stem 32 so as to give an indicator reading of zero or, in other words, so as to cause movable indicator hand 35 to coincide with the index graduation 36.

The master gauge ring is then removed and the movable gauging contact support 18 is permitted to separate from fixed gauging contact support 11 under the action of spring 49. Set screw 52 is then adjusted until it bears on fixed support 11 and, thereby, moves movable support 18 an amount sufficient to give an indicator reading of plus twenty thousandths of an inch.

The extended ends 42 and 42a of supports 11 and 18 are then compressed slightly, as by the fingers of one hand, while set screw 51 is adjusted against fixed support 11 to move support 18 about pivot pin 19 to give an indicator reading of minus twenty thousandths of an inch.

When the indicator has a reading of minus twenty thousandths of an inch, the distance between the measuring contact surfaces of set screws 47 and 47a will equal the minimum allowable internal diameter of the neck portion of a bottle of the type illustrated in the Fig. 1. When the indicator has a reading of plus twenty thousandths of an inch, the distance between the measuring contact faces of set screws 47 and 47a will equal the maximum allowable internal diameter of the neck of this bottle. The gauge is now in properly adjusted operating condition.

The limitations of "plus" and "minus" twenty thousandths of an inch from the mean preferred diameter as hereinbefore described is illustrative only. The deviation from the mean preferred diameter can be varied at will to serve the requirements and specifications related to the article being gauged.

To use the gauge, the extended ends 42 and 42a of the gauge supports may be introduced into the neck of the article to be gauged to the desired extent while the gauge and the article are held and suitably manipulated by the user. The gauge may be held by one hand of the operator and restrained from rotation as the article to be gauged is caused to rotate about its axis by the other hand of the operator. Movable gauging contact support 18 will move in response to variations of the internal surface contour being gauged and will, thereby, operate indicator 25 to give an indication of the dimensional variations. The above-outlined procedure may be repeated at as many axial positions of the bottle neck as is desired, as indicated by the dot-and-dash lines in Figure 1. Articles or bottles having internal diameters below the minimum allowable dimension will cause a binding action due to the interference with set screws 47 and 47a. Such bottles can be immediately rejected without further gauging. By means of the present gauge, such dimensional variations in the internal surface contour as would cause a bottle or similar article to be rejected can easily be ascertained. By using the gauge from time to time during production of bottles or other glass articles suitable for gauging, the producer of these articles can make early correction of any defect or shortcoming in the article-producing machinery or its operation indicated by the gauging operation to be causing defective internal surfaces in the neck portions of the articles being produced. This obviously is advantageous. The gauge also may be used to advantage at other places and by other persons who are concerned with the handling or use of the bottles or other articles referred to. Thus the gauge may be used to detect defective ware by a glassware packer or inspector at the packing end of a lehr, by a bottler or packer by whom bottles or other glass containers are to be filled, and by the user of automatic glassware inspection machinery to supplement or check the operation of such machinery.

With the foregoing and other objects in view, the invention resides in the novel arrangement and combination of parts and in the details of construction hereinafter described in the claims. It is to be understood that changes in the precise embodiment of the invention herein disclosed may be made within the scope of what is claimed without departing from the spirit of the invention.

I claim:

1. A gauge comprising a body formed to provide a handle or grip portion of suitable shape and size to be manually grasped and held by a user and a forwardly projecting barrel portion, said portions of the body extending in approximately right angular relation with each other, said body having a longitudinal slot formed therein to extend in the upper part of said barrel portion rearwardly from the forward end thereof for the full length thereof and in the upper part of said body above the handle or grip portion thereof, said body also having a lateral cavity formed therein so as to be located mainly in one side of the handle or grip portion and to include an upper portion extending upwardly in said body so as to intersect the longitudinal slot in the upper part of the latter, an indicator secured in said cavity so as to be completely disposed therein inwardly beyond the plane of the lateral face of the body containing said cavity and so that a movable operating stem of the indicator is positioned to extend upwardly in the upper part of said cavity into the intersected portion of said longitudinal slot, a relatively fixed gauging support bar and a cooperative relatively movable gauging support bar, both projecting from the forward end of the longitudinal slot in the body, said relatively fixed bar having its rearward end portion secured rigidly in place in said slot and the relatively movable bar being transversely pivoted in said slot so that the opposite ends thereof may swing to limited extents about a transverse pivotal axis relative to the corresponding ends of the fixed bar and so that the rearward end portion of said movable bar overlies the upper end of said indicator stem in a portion of said longitudinal slot, oppositely extending approximately aligned cooperative contact elements on the projecting end portions of the fixed and movable bars, respectively, means to limit the swinging movements of the movable bar about its transverse pivotal axis relative to the fixed bar, yieldable means urging the forward end portion of the movable bar away from the corresponding portion of the fixed bar, and an indicator stem-presetting and actuating element adjustably carried by the rearward end portion of said movable bar so as to bear on the upper end of said stem.

2. A gauge as defined in claim 9 wherein said indicator comprises a circular dial graduated to show dimensional variations in units of linear measurement from an index graduation and a pivoted pointer movable angularly about said dial in working relation to the graduations thereon in response to longitudinal movements of the indicator stem and wherein the ratio of the distance from the center line of the contact element on the projecting end of the movable support bar to the pivotal axis of such bar to the distance from such pivotal axis to the center line of the indicator stem-presetting and actuating element on the rearward end of said bar corresponds to the ratio of distance of angular movement of said pivoted indicator pointer to distance of longitudinal movement of the indicator stem in contact with said actuating element, whereby a change in the distance between the contact ends of the cooperative contact elements on the projecting ends of the gauging support bars will cause a like change in the reading of the indicator.

HENRY W. INGLE.

REFERENCES CITED

The following references are of record in the file of this patent:

UNITED STATES PATENTS

| Number | Name | Date |
|---|---|---|
| 667,665 | Beckh | Feb. 12, 1901 |
| 1,154,620 | Eitner | Sept. 28, 1915 |
| 1,274,331 | Rockwell | July 30, 1918 |
| 1,539,356 | Hortsmann | May 26, 1925 |
| 1,648,428 | Stacy | Nov. 8, 1927 |
| 1,660,986 | Berowitz | Feb. 28, 1928 |
| 1,811,480 | Stockwell et al. | June 23, 1931 |
| 1,835,807 | Parker | Dec. 8, 1931 |
| 2,024,020 | Aldeborgh | Dec. 10, 1935 |
| 2,229,748 | Lawrence | Jan. 28, 1941 |
| 2,337,509 | Todd | Dec. 21, 1943 |

OTHER REFERENCES

Publ.: American Machinist Magazine, Feb. 27, 1930, pages 383–384, "Indicating gage for roll retainers."

Certificate of Correction

Patent No. 2,468,496. April 26, 1949.

HENRY W. INGLE

It is hereby certified that error appears in the printed specification of the above numbered patent requiring correction as follows:

Column 7, line 18, for the claim reference numeral "9" read *1*;

and that the said Letters Patent should be read with this correction therein that the same may conform to the record of the case in the Patent Office.

Signed and sealed this 8th day of November, A. D. 1949.

[SEAL]

THOMAS F. MURPHY,
*Assistant Commissioner of Patents.*